(12) United States Patent
Sabannavar et al.

(10) Patent No.: US 8,568,099 B2
(45) Date of Patent: Oct. 29, 2013

(54) APPARATUS FOR HARVESTING ENERGY FROM A GEARBOX TO POWER AN ELECTRICAL DEVICE AND RELATED METHODS

(75) Inventors: Anil Nagesh Sabannavar, Singapore (SG); Jiun Keat Ong, Singapore (SG)

(73) Assignee: Vestas Wind Systems A/S, Aarhus N. (DK)

( * ) Notice: Subject to any disclaimer, the term of this patent is extended or adjusted under 35 U.S.C. 154(b) by 462 days.

(21) Appl. No.: 12/971,480

(22) Filed: Dec. 17, 2010

(65) Prior Publication Data

US 2012/0156034 A1    Jun. 21, 2012

(51) Int. Cl.
  *F03D 9/00*    (2006.01)
  *F03D 11/02*    (2006.01)

(52) U.S. Cl.
  USPC .................................................. 416/170 R

(58) Field of Classification Search
  USPC ............. 416/170 R; 290/1 C, 44, 45; 310/51
  See application file for complete search history.

(56) References Cited

U.S. PATENT DOCUMENTS

| | | | |
|---|---|---|---|
| 4,239,977 A | 12/1980 | Strutman | |
| 4,291,233 A | 9/1981 | Kirschbaum | |
| 5,663,600 A | 9/1997 | Baek et al. | |
| 5,967,940 A | 10/1999 | Yamaguchi | |
| 6,024,324 A | 2/2000 | Maino et al. | |
| 6,232,673 B1 | 5/2001 | Schoo et al. | |
| 6,304,002 B1 | 10/2001 | Dehlsen et al. | |
| 6,790,156 B2 | 9/2004 | Hosle | |
| 6,898,975 B2 | 5/2005 | Blunt | |
| 7,154,191 B2 | 12/2006 | Jansen et al. | |
| 2002/0049108 A1 | 4/2002 | Hosle | |
| 2003/0015052 A1 | 1/2003 | Hulshof | |
| 2003/0089177 A1 | 5/2003 | Luthje et al. | |
| 2003/0222456 A1 | 12/2003 | Mikhall et al. | |
| 2004/0237683 A1 | 12/2004 | Mikhail et al. | |
| 2005/0012339 A1 | 1/2005 | Mikhail et al. | |
| 2005/0282678 A1 | 12/2005 | Mundis | |
| 2006/0104815 A1 | 5/2006 | Siegfriedsen | |
| 2006/0205557 A1 | 9/2006 | Arndt et al. | |

(Continued)

FOREIGN PATENT DOCUMENTS

| AU | 672166 B3 | 9/1996 |
|---|---|---|
| DE | 19954164 A1 | 6/2001 |

(Continued)

OTHER PUBLICATIONS

USPTO, Office Action issued in related U.S. Appl. No. 12/179,061 dated Aug. 23, 2011.

(Continued)

*Primary Examiner* — Nathaniel Wiehe
*Assistant Examiner* — Brian O Peters
(74) *Attorney, Agent, or Firm* — Wood, Herron & Evans LLP

(57) ABSTRACT

Apparatus and methods for monitoring component health in a gearbox of a power generation system. A gearbox has a gear set with relatively-movable components, an armature attached to one of these components, and a magnet attached to another of these components. The armature is subjected to a changing magnetic field from the magnet that generates electrical energy. An electrical device for monitoring component health is inside the gearbox and is powered by the electrical energy received from the armature.

29 Claims, 11 Drawing Sheets

(56) References Cited

U.S. PATENT DOCUMENTS

| | | |
|---|---|---|
| 2006/0265175 A1 | 11/2006 | Shimohamadi |
| 2007/0108776 A1 | 5/2007 | Siegfriedsen |
| 2007/0129207 A1 | 6/2007 | Kanamori |
| 2008/0127755 A1 | 6/2008 | Kim |
| 2008/0279686 A1* | 11/2008 | Demtroder .................... 416/61 |
| 2008/0279696 A1 | 11/2008 | Liang |
| 2008/0315697 A1 | 12/2008 | Bonnet |
| 2009/0058094 A1 | 3/2009 | Jansen et al. |
| 2009/0163316 A1 | 6/2009 | Saenz De Ugarte et al. |
| 2009/0233721 A1 | 9/2009 | Saenz De Ugarte et al. |
| 2009/0289460 A1 | 11/2009 | Bech |
| 2009/0309369 A1 | 12/2009 | Llorente Gonzalez |
| 2010/0082276 A1 | 4/2010 | Becker |
| 2010/0105512 A1 | 4/2010 | Berger et al. |
| 2010/0198534 A1 | 8/2010 | Hala et al. |
| 2011/0230304 A1* | 9/2011 | Morel .......................... 475/331 |

FOREIGN PATENT DOCUMENTS

| | | | |
|---|---|---|---|
| DE | 10318945 | B3 | 10/2004 |
| EP | 0811764 | A1 | 12/1997 |
| EP | 1184567 | A2 | 3/2002 |
| EP | 1243791 | A2 | 9/2002 |
| EP | 1318329 | A2 | 6/2003 |
| EP | 1612458 | A2 | 1/2006 |
| EP | 2072858 | A1 | 6/2009 |
| GB | 2260815 | | 4/1993 |
| GB | 2382117 | A | 5/2003 |
| JP | 56168520 | A | 12/1981 |
| JP | 57018838 | A | 1/1982 |
| JP | 05119047 | A | 5/1993 |
| JP | 11037893 | A | 2/1999 |
| JP | 2002303254 | A | 10/2002 |
| WO | 9611338 | A1 | 4/1996 |
| WO | 2004040740 | A1 | 5/2004 |
| WO | 2005075822 | A1 | 8/2005 |
| WO | 2008113318 | A2 | 9/2008 |
| WO | 2009049599 | A2 | 4/2009 |

OTHER PUBLICATIONS

Office Action issued in related U.S. Appl. No. 12/179,061 dated Dec. 7, 2010.
USPTO, Office Action issued in related U.S. Appl. No. 12/179,061 dated May 27, 2012.
International Search Report, May 3, 2007, 3 pages.
IPRP, Jan. 25, 2007, 14 pages.
USPTO, Office Action issued in related U.S. Appl. No. 12/179,061 dated Feb. 8, 2012.

* cited by examiner

APPARATUS FOR HARVESTING ENERGY FROM A GEARBOX TO POWER AN ELECTRICAL DEVICE AND RELATED METHODS

TECHNICAL FIELD

This application relates generally to power generation systems and, more specifically, to the monitoring component health in a gearbox of a power generation system, such as a wind turbine.

BACKGROUND

A utility-scale wind energy system or wind farm includes a group of wind turbines that operate collectively as a power plant to produce electrical energy without the consumption of fossil fuels. A wind turbine includes a rotor, a generator and a gearbox housed in a nacelle, and is placed on a tower at a sufficient height above the surrounding terrain so that the turbine is provided with wind currents which are stronger and more consistent than those at ground level. Megawatt class wind turbines can have nacelles weighing over 100 tons and rotors spanning over 90 meters. Because of their size, weight and operational height, performing major repairs on a wind turbine is costly, often requiring a crane to remove the rotor and nacelle from the tower. The major subassemblies of a wind turbine are therefore typically designed to have a service life span greater than or equal to the estimated service life of the wind turbine to reduce expected maintenance costs.

Rotors in a large wind turbine produce rotation with a low angular velocity and a high torque moment. To provide rotation having an angular velocity suitable for generating electricity with the generator, the gearbox may be required to provide overdrive ratios on the order of 100:1. Because epicyclic gears are capable of providing large overdrive ratios and high power transmission efficiency in a compact form factor, they are often employed for the input stages of gearboxes in wind turbine applications. The large torque moments applied to the input of the gearbox and the high overdrive ratios used to transfer power to the generator subject the moving parts of the gearbox to extreme forces. These forces may cause components to wear to the point of failure before the design lifespan of the wind turbine has elapsed.

In normal operation, each gearbox component produces a characteristic vibration, or vibration signature, from contact with neighboring gears, bearings, and other components in the gearbox. As the component wears, its vibration signature may be altered enough to determine when it is nearing the end of its service life. Likewise, a component failure may alter the vibration signature it produces sufficiently to allow immediate detection of the failure. Thus, one potential way to monitor gearbox component health is by detecting and analyzing the vibrations produced by the gearbox components so that abnormal vibrations can provide an early warning to wind turbine operators. However, the vibration transmission path from many of the internal components of the gearbox to the gearbox case is attenuated by passage through lubricants, across multiple gears and bearing mating surfaces, and through other components. Individual component vibration signatures detected from outside the gearbox are also masked by vibrations emitted by other components, making it difficult to isolate a single failure. The combination of attenuated signals and background noise levels thus reduce the ability of sensors mounted to the gearbox case to detect worn components early in the failure process.

Mounting vibration sensors in closer proximity to the component being monitored may create a more direct path for vibration energy transmission. This may increase signal to noise ratio to more reliably detect abnormal vibration emissions of an individual component sufficiently early in the failure process to allow preventative measures to be implemented, or to schedule repairs, before the predicted failure occurs. However, because of the confined space of an epicyclic gearbox, as well as the complex rotation and movements of the internal components, using wires or cables to recover signals from, and provide power to, sensors mounted to moving parts within a gearbox is impractical.

Accordingly, there is a need for improved systems and methods for monitoring the health of a wind turbine gearbox that allow sensors to accurately assess vibration signatures and to operate without cables or wires.

SUMMARY

To address these and other shortcomings of conventional systems, an apparatus for use in a power generation system includes a gearbox having a gear set with a first component and a second component movable relative to the first component; an armature attached to the first component of the gear set; a magnet attached to the second component of the gear set such that the magnet and the armature exhibit relative motion during operation of the gear set so that the armature is subjected to a changing magnetic field from the magnet that generates electrical energy; and an electrical device inside the gearbox that is electrically coupled with the armature such that the electrical device is powered by the electrical energy.

In one embodiment, the gear set may be an epicyclic gear set including an outer ring gear, a sun gear, a plurality of planetary gears coupling the sun gear with the outer ring gear, and a carrier supporting the planetary gears. The first component may be selected from one of the outer ring gear, the sun gear, one of the planetary gears, or the carrier, and the second component may be selected from another of the outer ring gear, the sun gear, one of the planetary gears, or the carrier. For example, in one embodiment, the first component is one of the planetary gears. In another embodiment, the second component is one of the planetary gears. The electrical device may be attached to the gear set, such as to the first component.

The electrical device may include a wireless sensor configured to sense a variable relating to the operation of the gearbox, and to wirelessly output a signal indicative of the sensed variable. For example, in one embodiment, the sensed variable may be vibration energy generated inside the gearbox. The wireless sensor may include a transceiver that wirelessly outputs the signal and the apparatus may further include an antenna associated with the gearbox, wherein the antenna is configured to receive the signal from the transceiver of the wireless sensor and communicate the signal to another transceiver external to the gearbox.

A power supply may be provided for electrically coupling the armature with the electrical device. The power supply is configured to capture and condition the electrical energy supplied from the armature to the electrical device. In one embodiment, the power generation system is a wind turbine having a rotor and a generator, wherein the gear set of the gearbox couples the rotor with the generator.

In another embodiment, a method of powering an electrical device in a gearbox is also disclosed and includes attaching an armature to the first component of the gear set; attaching a magnet to the second component of the gear set; locating an electrical device inside the gearbox; and electrically coupling the electrical device with the armature so that electrical energy from the armature powers the electrical device when the first and second components are moved relative to each other. The gear set may be an epicyclic gear set and attaching the armature to the first component may include attaching the armature to one of the outer ring gear, the sun gear, one of the planetary gears, or the carrier, and attaching the magnet to the second component may include attaching the magnet to another of the outer ring gear, the sun gear, one of the planetary gears, or the carrier. The electrical device may include a wireless sensor configured to sense a variable relating to the operation of the gearbox and to wirelessly output a signal indicative of the sensed variable. In one embodiment, the sensed variable may be the vibration energy generated inside the gearbox. The method may further include configuring the wireless sensor with a transceiver capable of wirelessly outputting the signal, and configuring the gearbox with a transceiver capable of receiving the signal from the transceiver of the wireless sensor and communicating the signal to another transceiver external to the gearbox.

In still another embodiment, a method of powering an electrical device in a gearbox includes causing relative movement between an armature attached to the first component of the gear set and a magnet attached to the second component of the gear set; generating electrical energy in the armature by subjecting the armature to a changing magnetic field from the magnet; and powering an electrical device inside the gearbox with the electrical energy. The method may further include sensing a variable relating to the operation of the gearbox with a wireless sensor, and wirelessly outputting a signal indicative of the sensed variable from the wireless sensor. The wireless sensor may include a transceiver and the method may further include transmitting the signal from the transceiver to another transceiver external to the gearbox. A power supply may capture and condition the electrical energy supplied from the armature to the electrical device.

In another embodiment, a monitoring system is provided for monitoring a health status of wind turbine gearbox. The monitoring system includes a wireless sensor configured to collect vibrational data from the wind turbine gearbox during operation and a processing center coupled in communication with the wireless sensor. The processing center is configured to receive the vibrational data communicated from the wireless sensor and to analyze the vibrational data to determine the health status of the wind turbine gearbox.

In another embodiment, a method is provided for a health status of wind turbine gearbox. The method includes operating the wind turbine gearbox and, in response to operating the wind turbine gearbox, collecting vibrational data using a wireless sensor inside the wind turbine gearbox. The method further includes communicating the vibrational data from the wireless sensor externally to the wind turbine gearbox and analyzing the vibrational data to determine the health status of the wind turbine gearbox.

BRIEF DESCRIPTION OF THE DRAWINGS

The accompanying drawings, which are incorporated in and constitute a part of this specification, illustrate various embodiments of the invention and, together with a general description of the invention given above and the detailed description of the embodiments given below, serve to explain the embodiments of the invention.

DETAILED DESCRIPTION

Generally, the embodiments of the invention are directed to remote monitoring of wind turbine gearbox component health in wind energy applications through sensors coupled to the component, and/or neighboring components, and to methods and systems for supplying power to the sensors. Sensors communicate data over a wireless communications link and are provided with power from energy harvested locally. In this way, the sensors may operate indefinitely without the need for wires, cables, or other physical connections to cross moving boundaries. Energy is harvested inductively by mounting an armature to the component, and placing a magnet so that the armature is subjected to a changing magnet flux by the motion of the gearbox. Local energy harvesting may allow the sensors to function indefinitely. In representative embodiments, the monitored components reside within an epicyclic gearbox, although the invention is not so limited. Monitoring may include obtaining component health data from multiple turbines in either the same or different wind farms and collecting the data in a centralized database.

Figure 1:
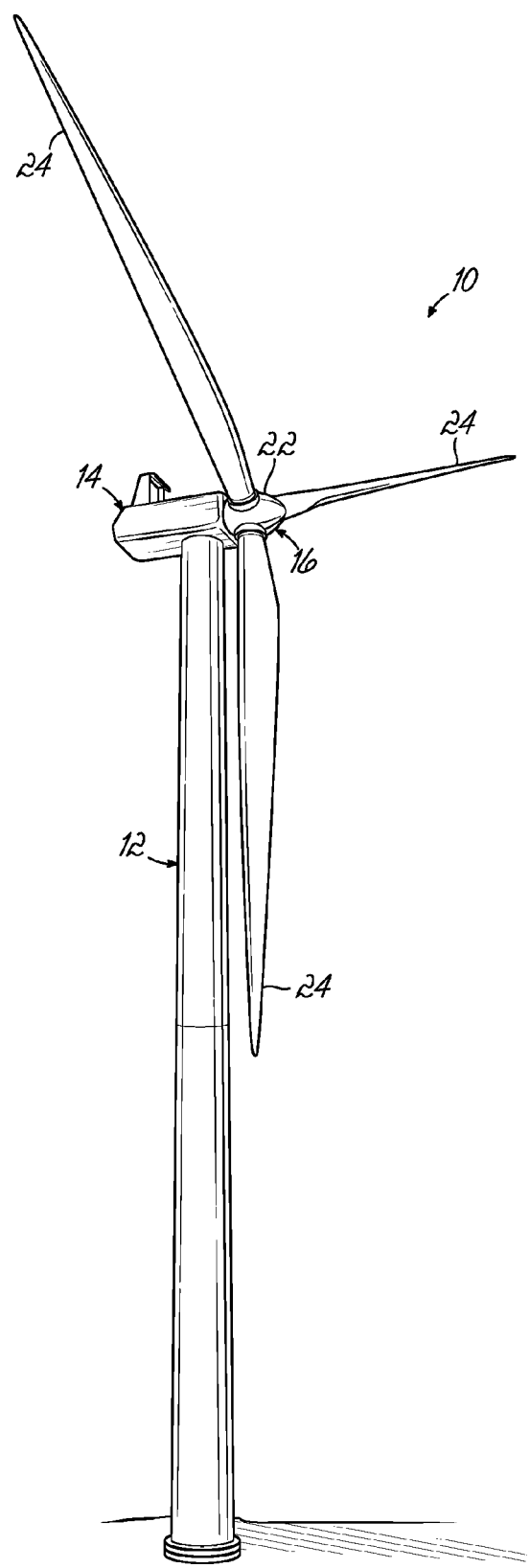
FIG. 1 is a perspective view of a wind turbine typical of that used in a wind farm.
Figure 2:
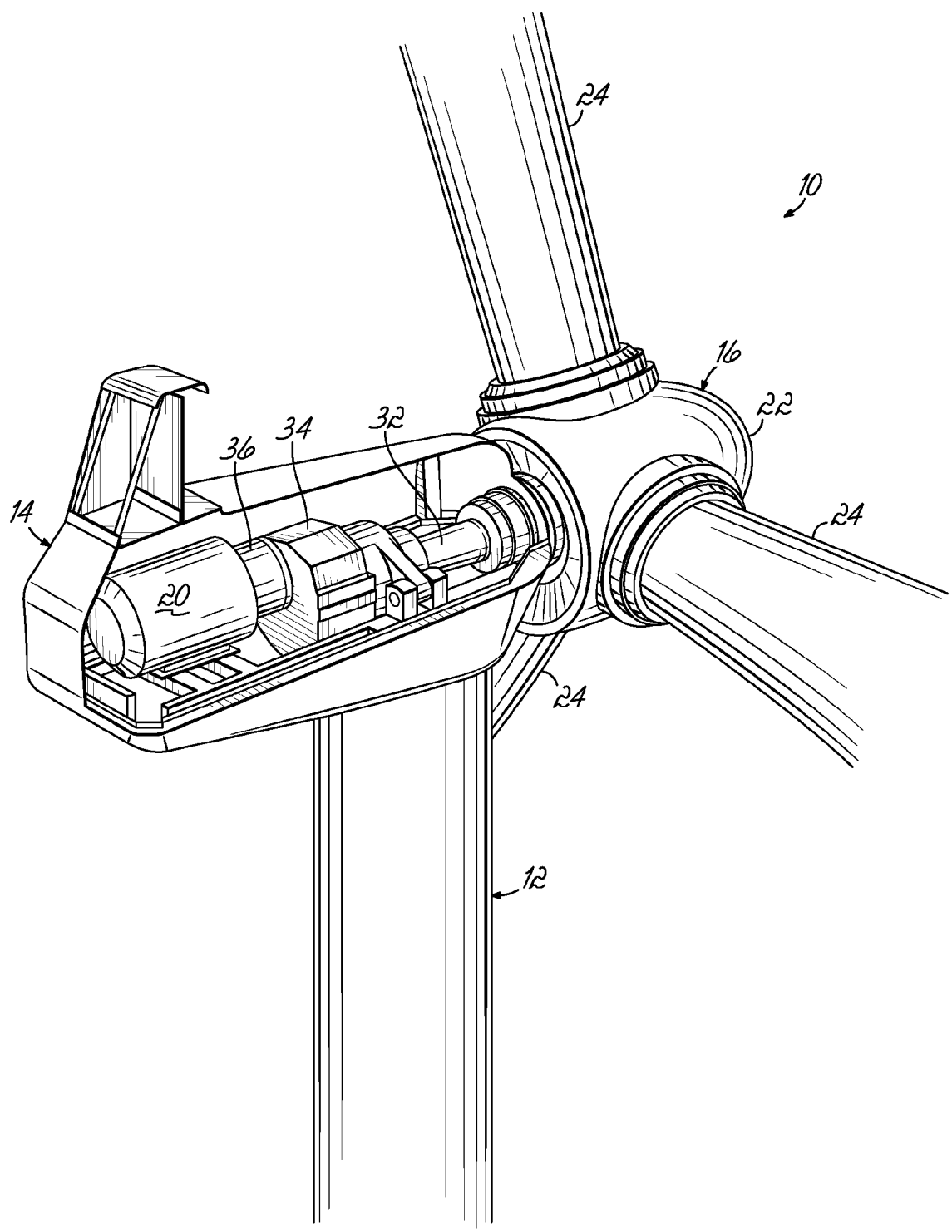
FIG. 2 is a perspective view of a portion of the wind turbine of FIG. 1 in which the nacelle is partially broken away to expose structures housed inside the nacelle.

With reference to FIGS. 1 and 2, wind turbine 10 includes a tower 12, a nacelle 14 disposed at the apex of the tower 12, a rotor 16 operatively coupled to a generator 20, and a gearbox 34 housed inside the nacelle 14. In addition to the generator 20 and gearbox 34, the nacelle 14 houses various components needed to convert wind energy into electrical energy and to operate and optimize the performance of the wind turbine 10. The tower 12 supports the load presented by the nacelle 14, rotor 16, and other wind turbine components housed inside the nacelle 14 and operates to elevate the nacelle 14 and rotor 16 to a height above ground level or sea level, as may be the case, at which air currents having lower turbulence and higher velocity are typically found.

The rotor 16 may include a central hub 22 and a plurality of blades 24 attached to the central hub 22 at locations distributed about the circumference of the central hub 22. In the representative embodiment, the rotor 16 includes three blades 24. The blades 24, which project radially outward from the central hub 22, are configured to interact with passing air currents to produce rotational forces that cause the central hub 22 to spin about its longitudinal axis. The design, construction, and operation of the blades 24 are familiar to a person having ordinary skill in the art of wind turbine design, and may include additional functional aspects to optimize performance. For example, pitch angle control of the blades 24 may be implemented by a pitch control mechanism (not shown) responsive to wind velocity to optimize power production in low wind conditions, and to feather the blades if wind velocity exceeds design limitations.

The rotor 16 may be coupled to the gearbox 34 directly or, as shown, indirectly via by a drive shaft 32. Either way, the gearbox 34 transfers the rotation of the rotor 16 through a coupling 36 to the generator 20. Wind exceeding a minimum level may activate the rotor 16, causing the rotor 16 to rotate in a direction substantially perpendicular to the wind, applying torque to the input shaft of the generator 20. The electrical power produced by the generator 20 may be supplied to a power grid (not shown) or an energy storage system for later release to the grid as understood by a person having ordinary skill in the art. In this way, the kinetic energy of the wind may be harnessed by the wind turbine 10 for power generation.

The gearbox 34 converts the slow rotational speed of the rotor 16 to a rotational speed suitable for generating electricity. The output of the gearbox 34 may be coupled to the generator 20 by a coupling 36, which may provide an elastic connection between output shaft of the gearbox 34 and an input of the generator 20. The generator 20 converts the mechanical energy applied to its input into electrical energy by causing relative motion between an armature and a magnetic. The gearbox 34 may include one or more stages utilizing epicyclic gear sets. Epicyclic gear sets are capable of providing large overdrive ratios and high power transmission efficiency in a compact form factor, making them well suited for use in wind turbine gearboxes.

Figure 3:
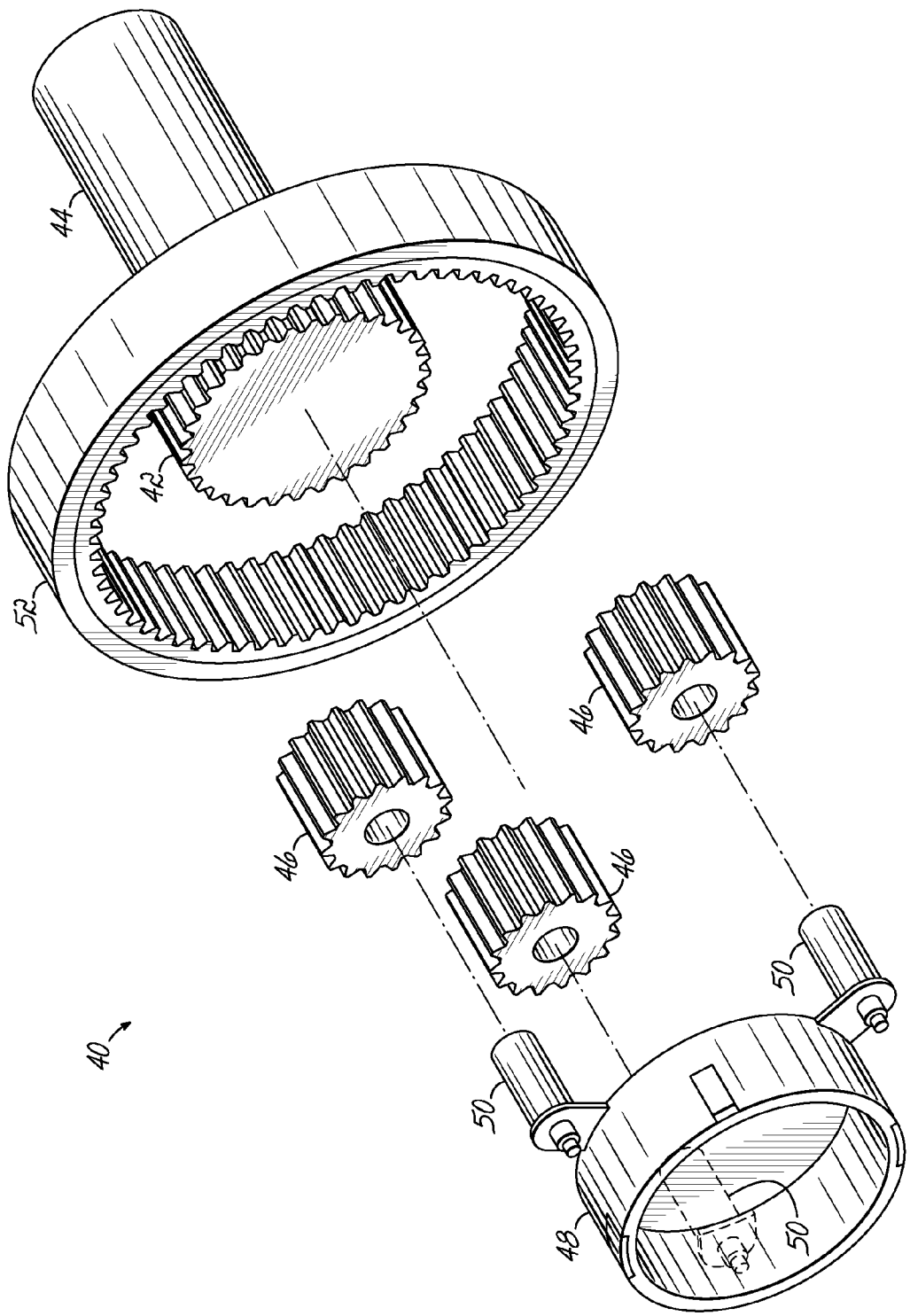
FIG. 3 is an exploded perspective view of an exemplary epicyclic gear set comprising a stage of a wind turbine gearbox.
Figure 4:
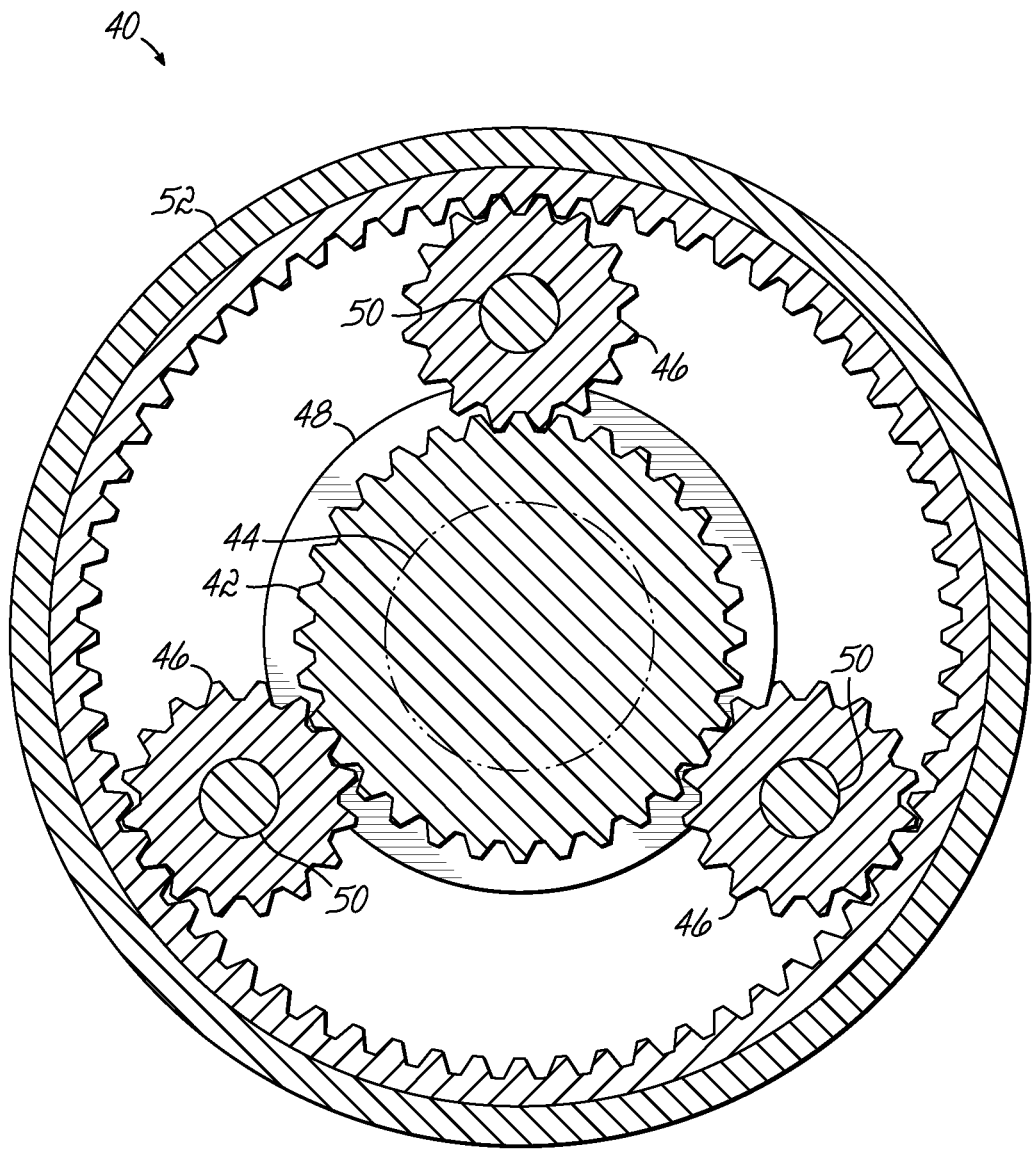
FIG. 4 is a cross-sectional end view of the epicyclic gear set in FIG. 3.

A gearbox generally includes a first component and a second component movable relative to the first component. As will be explained in further detail below, the relative movement between these components of the gearbox may be used to harvest power from the gearbox in order to power an electrical device which may, for example, monitor the health of one or more of the components. To this end, and with reference to FIGS. 3 and 4, the gearbox 34 may include an epicyclic gear set 40 with a pinion or sun gear 42, a pinion shaft 44, a plurality of planet gears 46, a carrier 48 including a plurality of pins 50, and an annulus or outer ring gear 52. Sun gear 42 has outward facing and circumferentially distributed teeth that mesh with the planet gears 46, and may be attached to shaft 44 so that the sun gear 42 and shaft 44 rotate together as a unit. For purposes of illustration, the epicyclic gear set 40 is shown with three planet gears 46, however various numbers of planet gears 46 may be used, depending on the relative sizes of the sun gear 42 and outer ring gear 52, as well as other design factors. Each planet gear 46 may be attached to one of the pins 50 so that each planet gear 46 is free to rotate and spin about the axis of the respective pin 50. A bearing (not shown) may be introduced to reduce friction and transfer loading between the planet gear 46 and pin 50. Outer ring gear 52 includes inward facing and circumferentially distributed teeth that mesh with the teeth on the planet gears 46 so that, when the carrier 48 rotates relative to outer ring gear 52, each planet gear 46 rotates about the axis of its corresponding pin 50.

The epicyclic gear set 40 may be configured to transmit rotational torque from an input to an output by holding one of either the sun gear 42, carrier 48, or outer ring gear 52 stationary, coupling torque to the non-stationary component serving as the input, with the remaining component serving as the output. To provide an overdrive ratio, the epicyclic gear set 40 may be configured so that the carrier 48 serves as the input, the outer ring gear 52 is held stationary, and pinion shaft 44 serves as the output. In this configuration, the overdrive ratio of the gear set is (1+A/S), where A is the number of teeth in the outer ring gear 52, and S is the number of teeth in the sun gear 42. To achieve higher overdrive ratios, gearbox 34 may include multiple gear sets 40 placed in series, with the output of one epicyclic gear set 40 driving the input of the next epicyclic gear set 40, so that the overall gear ratio is the product of the ratios of multiple epicyclic gear sets 40. In an embodiment of the invention, gearbox 34 may include two epicyclic gear sets 40 configured in series, and may also include a parallel gear stage to couple the output of the second planetary gear stage to the generator 20, providing an overall overdrive ratio in the range of 80:1 to 100:1 between the rotor 16 and generator 20. The two epicyclic gear sets 40 may also share a single outer ring gear 52, in which case the outer ring gear 52 will have sufficient axial length to accommodate two sets of planet gears and two sun gears.

Figure 5:
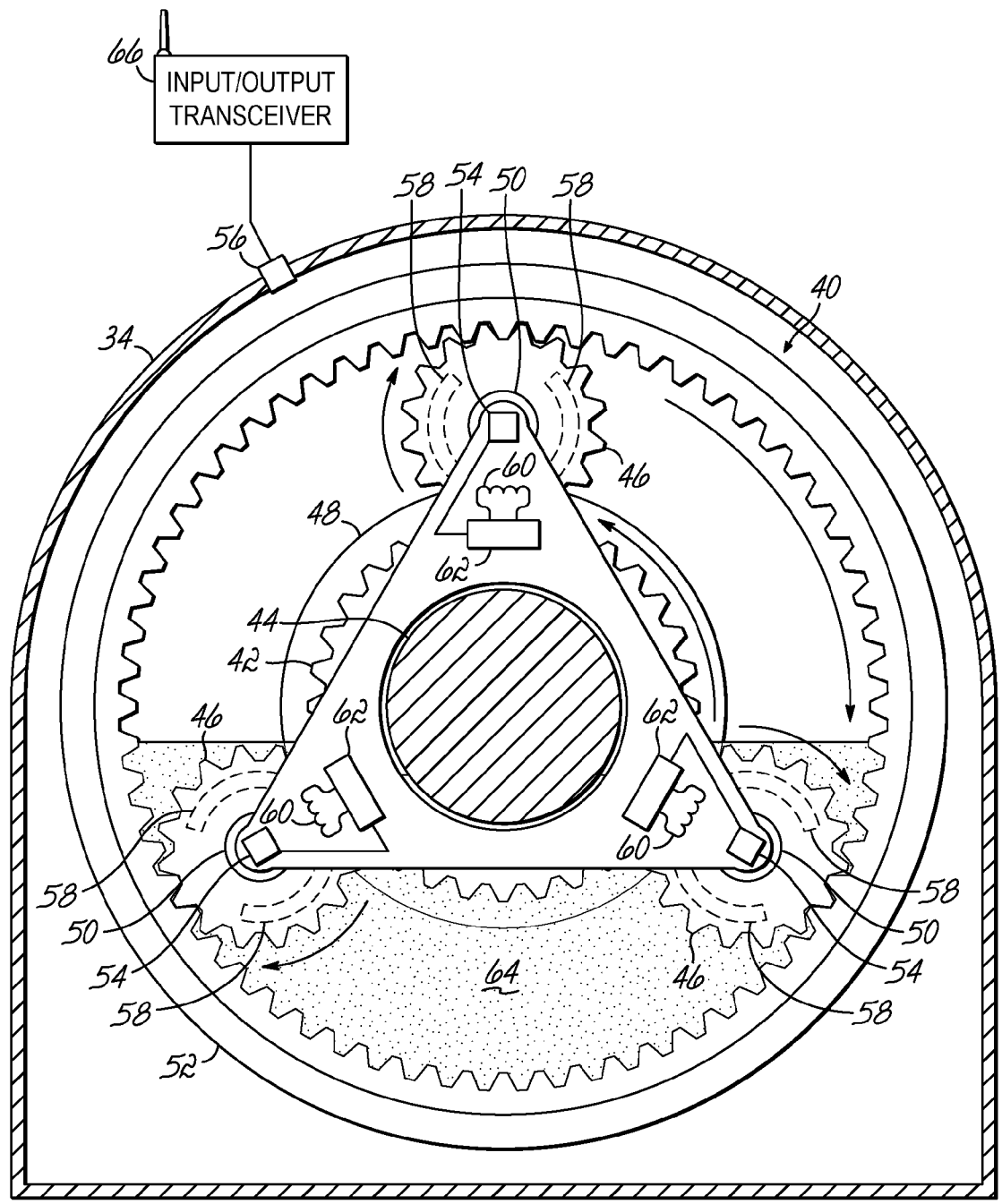
FIG. 5 is the epicyclic gear set in FIG. 4 illustrating wireless vibration sensors and their associated magnetic induction energy harvesting components integrated into the carrier.

In reference to FIG. 5, the gearbox 34 may contain a lubricant 64 to reduce friction and wear on the gearbox components by coating them during rotation through the lubricant 64. To this end, the lubricant 64 may form a sump within the gearbox 34 so that the gearbox components become splash lubricated during operation. Alternatively or additionally, the lubricant 64 may be forced (i.e., pressure-fed) from an external tank to desired areas thereby reducing or eliminating the need for a sump.

Figure 6:
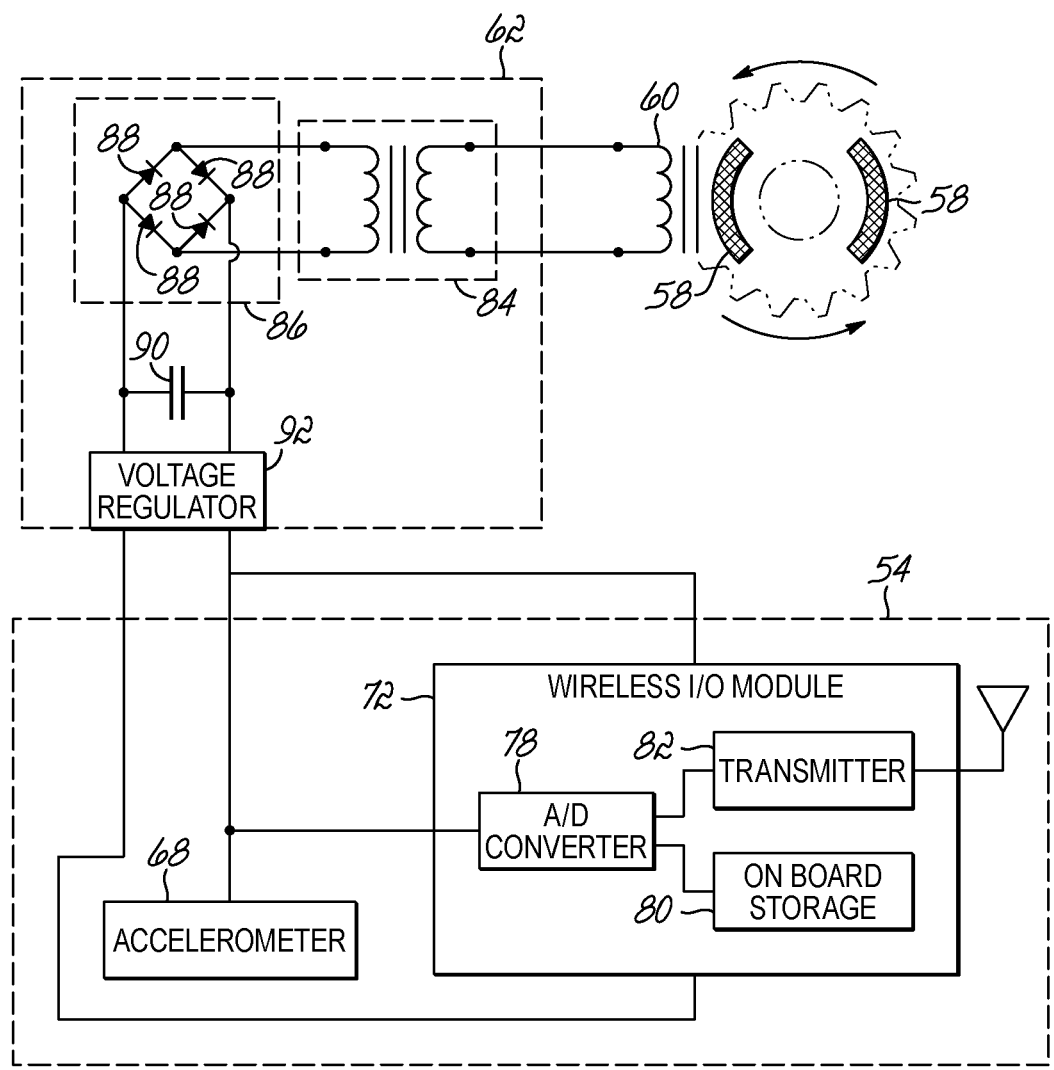
FIG. 6 is a diagrammatic view of the wireless sensor with the magnetic induction energy harvesting power supply.

With reference to FIGS. 5 and 6, the gearbox 34 and epicyclic gear set 40 inside the gearbox 34 may include an electrical device configured to monitor at least one of the components of the gear set 40. In one embodiment, the electrical device may include one or more wireless sensors 54. In this regard, the gearbox 34 may include wireless sensors 54, an antenna 56, magnets 58, armatures 60, and power supplies 62, which together form a communications system for wirelessly transmitting gearbox data relating to operation of the gearbox 34 to a wireless input/output (I/O) transceiver 66. In one embodiment, the data may be vibrational data. However, other data which may, for example, be indicative of component health may also be transmitted. Individual wireless sensors 54 may be located on the carrier 48 in close proximity to the pins 50 to increase sensor sensitivity to the vibration emissions of the individual planet gears 46, or a single sensor may be mounted to the carrier 48 and used to collectively monitor multiple gearbox components. Because planet gears 46 come into direct contact with the outer ring gear 52 and with the sun gear 42, one or more wireless sensors 54 attached to the carrier 48 may be more sensitive to vibrations emanating from components subject to wear in comparison with a conventional sensor mounted on the exterior of the gearbox 34.

Although the wireless sensors 54 are directly mounted to the carrier 48 in the representative embodiment, the invention is not so limited, and any combination of wireless sensors 54 directly coupled to, or embedded in, the sun gear 42, pinion shaft 44, planet gears 46, pins 50, outer ring gear 52, or any other component could also be employed to monitor gearbox component health and the condition of the epicyclic gear set 40. For example, the wireless sensors 54 may be able to detect individual worn or broken components before catastrophic failure occurs. The ability to preemptively predict a failure before occurrence may provide an operator with the option of scheduling preventative maintenance or taking other preventative measures, such as reducing the turbine output, to prevent the failure or to delay the failure. Wireless sensors 54 may be mounted within a cavity in, or on an outer surface of, the component to which they are coupled, so that they are subject to vibrations generated by and/or transmitted to the component.

The wireless sensors 54 may be a commercially available sensor, and may convert the vibration sensor signal to digital data using an analog to digital (A/D) converter, or may transmit it as an analog signal proportional to the voltage produced by the vibration transducer. Digital data may be stored by the wireless sensors 54 in memory for later transmission when queried, automatically at periodic intervals to conserve power or channel capacity, based on the availability of a transmission channel, or the data may be transmitted continuously in real time. When transmissions are made periodically to conserve sensor power, the periodicity of transmissions may depend on how much memory is available to the sensors 54, ranging from several seconds to several minutes. Antenna 56 may provide a radio frequency (RF) path from the interior of the gearbox 34 to the wireless I/O transceiver 66, so that it is in communication with the wireless sensors 54.

Because the main bearing and rotor shaft for the input of gearbox 34 typically turn at an angular velocity of less than 30 revolutions per minute (RPM), detection of vibrations produced by the low-speed stage gear set may require the wireless sensors 54 to have the ability to measure vibration signals having a frequency content with a range of about 0.1 Hz to about 6,000 Hz. As the rotational speed is increased by the gearbox 34, the frequency of the vibrations produced will also increase, so that the design bandwidth of the wireless sensors 54 may be tailored to the angular velocity at which the components they are monitoring are rotating. Wireless sensors 54 monitoring the vibrations produced by components in the higher speed stages of gearbox 34 may require the ability to measure vibration signals having a frequency content ranging from about 3,000 Hz to about 20,000 Hz.

If the operating environment of the wireless sensors 54 includes lubricant 64, a wireless lubricant sensor (not shown), such as a float level switch, may be used to sense if any of the wireless sensors 54 are submerged in the lubricant 64 so that transmissions may be scheduled for when submersion is absent. The wireless lubricant sensor may alternatively be one configured to measure lubricant quality (e.g., contaminate levels) or properties (e.g., temperature).

With reference to FIG. 6, the wireless sensor 54 may include an accelerometer 68 or other vibration transducer that outputs a signal in response to acceleration—i.e., vibrations—in one or more axes. Exemplary vibration transducers for used with accelerometer 68 include, but are not limited to, piezoelectric type transducers, constant current type transducers, capacitive type transducers, etc. The output from the accelerometer 68 represents the vibration energy present at the wireless sensor 54 and is supplied to a wireless input-output (I/O) module 72.

The wireless I/O module 72 may include an analog-to-digital (A/D) converter 78, on-board storage 80, and a transmitter 82. The wireless I/O module 72 may encode the signal provided by the accelerometer 68 using the A/D converter 78 to produce digital data representing the output signal of the accelerometer 68. The data may be further encoded and transmitted over RF by the transmitter 82 so that it can be received by the antenna 56. Data transmission may occur in real-time, or the data may be retained in on-board storage 80 for transmission at a later time.

The power supply 62 captures the electrical energy provided by the armature 60 and conditions the captured electrical energy so that the conditioned electrical energy may be used to power the wireless sensor 54. The power supply 62 may include a transformer 84, a rectifier 86 comprised of diodes 88 configured into a ring, and an energy storage device 90, which may be a capacitor, rechargeable battery, or other suitable energy storage device. The power supply 62 may also include a regulator 92 to condition the output of the supply so that it provides a consistent voltage. The operation of such an arrangement is as follows: as the magnets 58 moves past the armature 60, a time varying, or alternating current (AC) may be induced in the armature 60 due to a time varying magnetic field. The armature 60 is coupled to the input of the transformer 84 so that the currents flow through the primary coil of the transformer 84, inducing currents in the secondary coil at a voltage level suitable for generating power for the wireless sensor 54. The AC currents at the output of the transformer 84 are passed through the rectifier 86 so that a voltage having a DC component is produced. The output of the rectifier 86 is used to charge the energy storage device 90 to provide a power reservoir. The power may be further conditioned by the voltage regulator 92 so that the power supply 62 provides a consistent voltage to the wireless sensor 54 under varying operating conditions, such as varying magnet rotational speed and wireless sensor electrical loads.

The armature 60 may include a wire or other conductor located so that it is exposed to a changing magnetic flux due to the relative motion between the armature 60 and the magnets 58. The armature 60 may be formed from a suitable conductor, such as copper or aluminum, and may be coated with an insulating material, such as a varnish. The armature 60 may be formed into loops, coils or other shapes to increase the current induced by the changing magnetic flux. The coils may be formed with an air core, or may include a core material, such as a laminate of soft iron or other magnetic material, and layers of an insulating material to prevent the formation of eddy currents. The armature 60 may also include several coils electrically coupled together and individually located to harvest energy from magnets 58 located in separate gears or other moving components, and may couple energy harvested from multiple locations into a single power supply 62. Alternatively, multiple armatures 60 may be connected to a single power supply 62.

In one embodiment, each magnet 58 is a rare-earth magnet containing a magnetic material composed of an alloy containing one or more rare earth (lanthanide) elements, such as neodymium or samarium, that are ferromagnetic metals. Certain alloys containing rare earth elements and transition metals, such as iron, nickel, or cobalt, have a Curie temperature far above room temperature, which is a desirable property for permanent magnets operating in a high temperature environment. Representative alloys suitable for the magnetic material of the magnets 58 include, but are not limited to, a samarium alloy containing cobalt ($SmCo_5$) and a neodymium alloy containing iron and boron ($Nd_2Fe_{14}B$). A plating layer or coating may be applied to protect the magnets 58 against corrosion, breakage, and chipping. Rare earth alloys are characterized by a crystalline structure of large magnetic anisotropy that promotes magnetization in one particular direction by a strong magnetic field but, once magnetized, is resistant to being magnetized in any different direction. The gearbox 34 may include a cooling system (not shown) that prevents the temperature of the magnets 58 from exceeding the Curie temperature of the constituent magnetic material.

Each of the magnets 58 may be constituted by a single, unitary permanent magnet of a monolithic construction, or may be an assembly that includes multiple individual permanent magnets. The magnets 58 may be embedded in the gearbox component to which they are attached, or may be adhesively bonded to an outer surface of the gearbox component. The magnets 58 may also be joined to the gearbox component using mechanical clips, frames, or other conventional mechanical fastening techniques.

In alternative embodiments, the magnetic material in the magnets 58 may be a ceramic or ferrite material, or alnico. However, rare earth alloys are preferred for the magnets 58 because of a comparatively higher remanence ($B_r$) that is related to magnetic field strength, a comparatively higher coercivity ($H_{ci}$) that gauges resistance to demagnetization, and a comparatively higher energy product ($BH_{max}$) that is related to energy density.

The permanent magnets are illustrated as having a curvature to conform to the shape of the component to which it is mounted. However, each permanent magnet is not constrained to have a curved shape, and may have a rectangular shape, or any other shape.

The energy harvested from the relative motion of the magnets 58 and armatures 60 by magnetic induction permits the wireless sensors 54, which may be mounted to moving components of the gearbox 34, to be powered with limited use of wires or cables. Magnetic induction is a physical phenomenon that produces a voltage across a conductor when the conductor is moved relative to a magnetic field. The use of energy harvesting maintains the energy storage device 90 in a charged state so that the wireless sensors 54 may be internally powered, which reduces or eliminates concerns over the lifespan of a conventional battery in a wireless sensor application. The energy storage device 90 may not have to be replaced over the life of the gearbox 34, which may eliminate or at the least reduce the need to access internal components of the gearbox 34 and to take the wind turbine 10 out of service. As a result, the energy harvesting improves the practicality of wireless sensors 54 in the gearbox 34. As a solution to the problem of powering the wireless sensors 54, magnetic induction energy harvesting may be used to provide a source of power with a substantially indefinite duration.

With reference to FIGS. 7-10, in which like reference numerals refer to like features in FIGS. 1-6, diagrammatic end views of the epicyclic gear set 40 are presented with the carrier 48 and gearbox 34 outer casing omitted for clarity, illustrating various representative embodiments of the invention. Although the armatures 60 are illustrated as formed from various numbers of coils electrically coupled together, it is understood that the armatures 60 may include any number of coils, and may also be formed from a single wire, wire loop, or coil depending on the size and configuration of the gear set components to which component the armature is mounted, as well as size and number of planet gears 46. Likewise, it is understood that the size, number, and position of both the magnets 58, and the armatures 60 may vary from those shown without departing from the spirit or scope of the general inventive concept.

Figure 7:
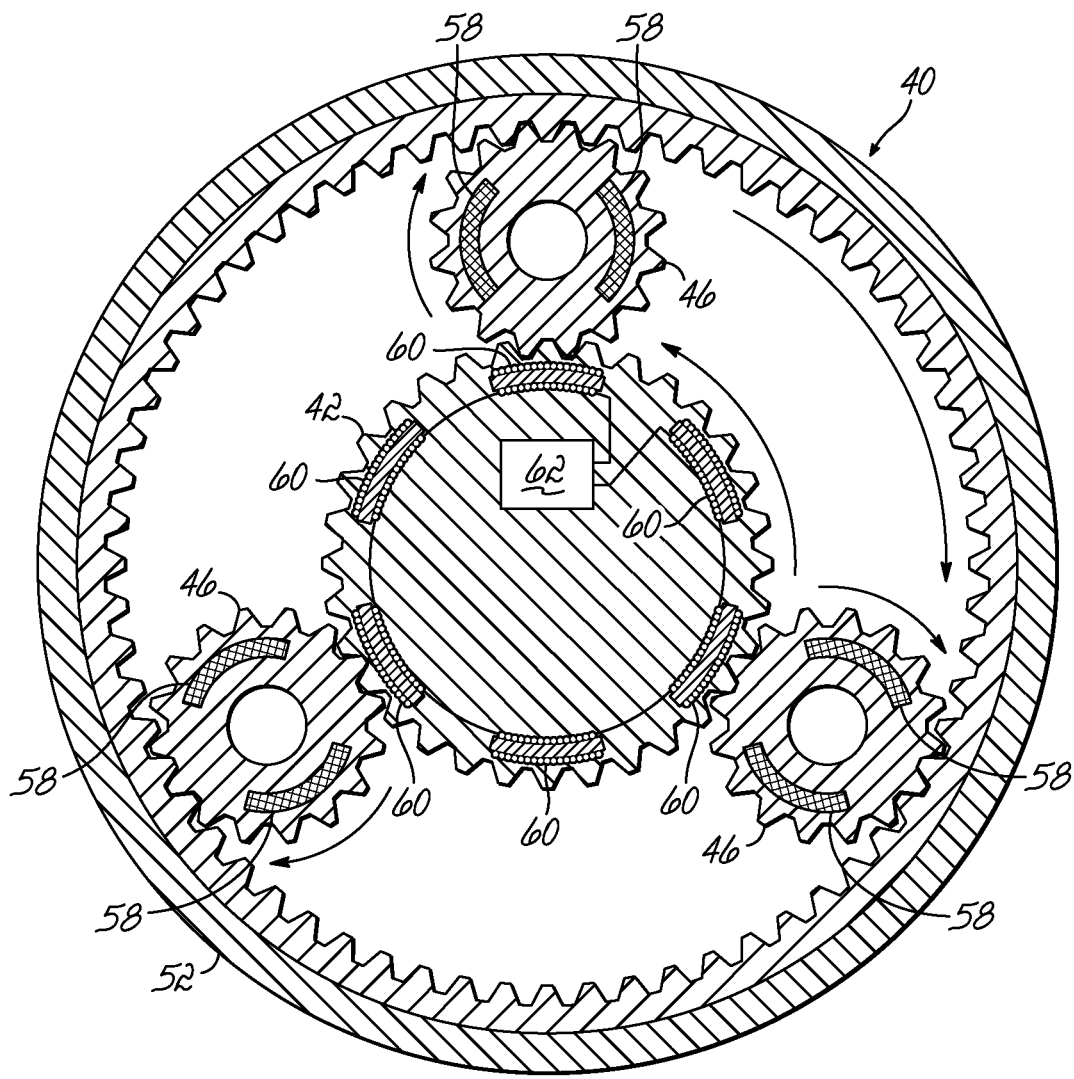
FIG. 7 is a cross-sectional end view of an epicyclic gear set illustrating component placement for a wireless sensor magnetic induction harvesting system.

With specific reference to FIG. 7, the armatures 60 are mounted in fixed positions relative to sun gear 42, and magnets 58 are mounted in fixed positions relative to planet gears 46 generally as shown. The armatures 60 may be mounted on a surface of the sun gear 42, or in one or more cavities located within the sun gear 42, and the magnets 58 may be similarly mounted to the planet gears 46. The armatures 60 are electrically coupled to a power supply 62, which may also be mounted to the sun gear 42. When relative motion occurs between the sun gear 42 and carrier 48, such as when the outer ring gear 52 is fixed and the sun gear 42 rotates, planet gears 46 rotate about their respective pins 50, causing magnets 58 to move relative to the armatures 60, so that a voltage may be induced in armatures 60 by the relative motion of the armatures 60 through the magnetic fields produced by the magnets 58. The power supply 62 conditions and stores the power harvested by the armatures 60 so that it may supply power to one or more wireless sensors 54. For armatures 60 mounted to the sun gear 42, the power supply 62 may be used to provide power to one or more wireless sensors 54 mounted in the sun gear 42 or pinion shaft 44, thus avoiding coupling electrical power to wireless sensors 54 that are moving relative to the power supply 62. Different placements of the armatures 60 and magnets 58 may be preferable depending on where the wireless sensors 54 requiring power are located, and may also depend on whether the epicyclic gear set 40 is configured with the sun gear 42, carrier 48 or outer ring gear 52 as the stationary member.

Figure 8:
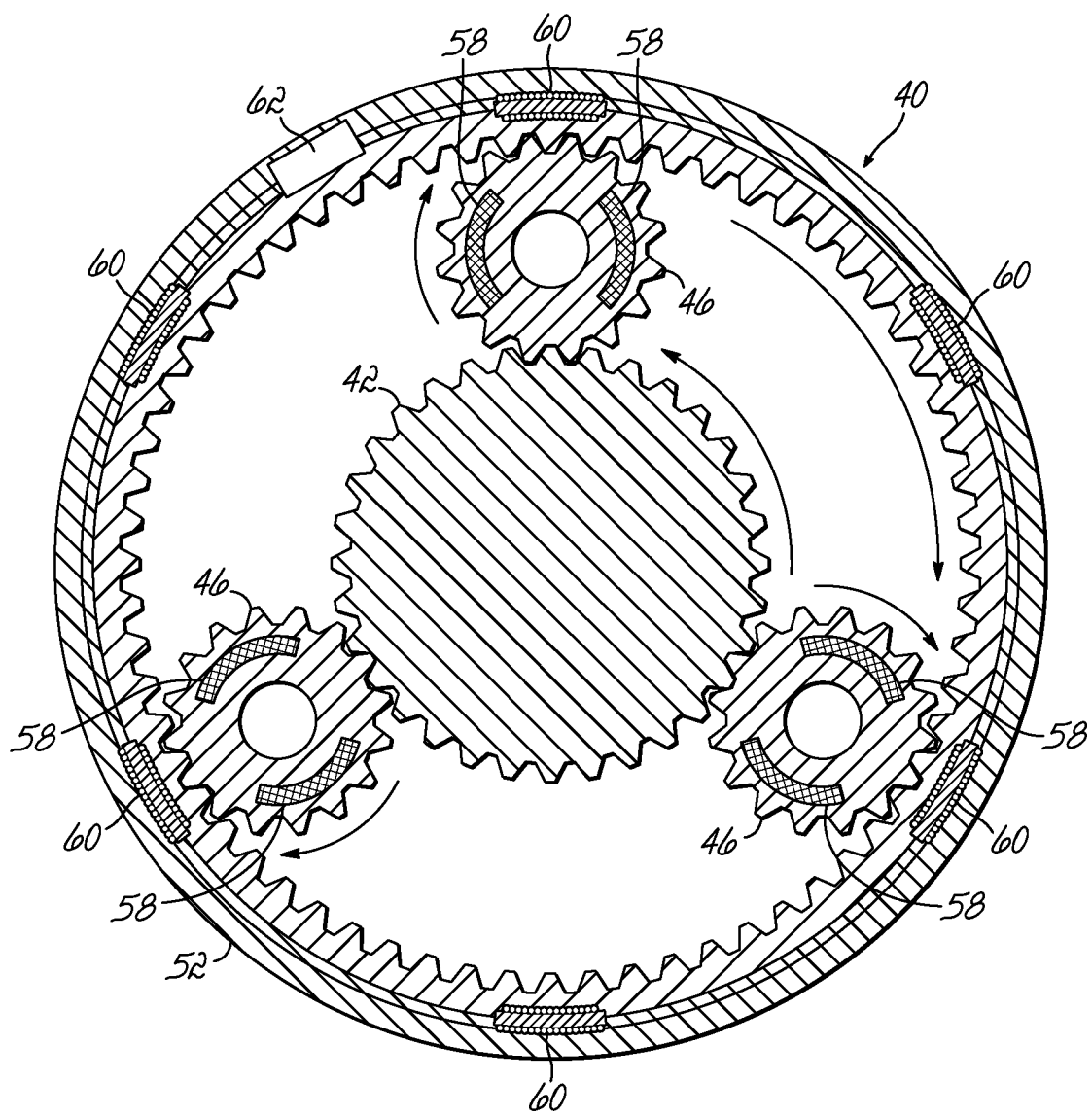
FIGS. 8-10 are cross-sectional end views of the epicyclic gear set in FIG. 7 illustrating alternative embodiments of the wireless sensor magnetic induction energy harvesting system.

With specific reference to FIG. 8, the armatures 60 are mounted in fixed positions relative to the outer ring gear 52, and the magnets 58 are mounted in fixed positions relative to planet gears 46 generally as shown. The armatures 60 may be mounted on the outer ring gear 52, or in cavities within the outer ring gear 52, and the magnets 58 may be similarly mounted to the planet gears 46. When relative motion occurs between the outer ring gear 52 and carrier 48, such as when the carrier 48 is fixed and the outer ring gear 52 rotates, planet gears 46 may rotate about their respective pins 50, causing magnets 58 to move relative to the armatures 60, so that a voltage may be induced in armatures 60 by the relative motion of the armatures 60 through the magnetic fields produced by the magnets 58. The power supply 62 conditions and stores the power harvested by the armatures 60 so that it may supply power to one or more wireless sensors 54. For armatures 60 mounted to the outer ring gear 52, the power supply 62 may be used to provide power to one or more wireless sensors 54 mounted to the outer ring gear 52, thus avoiding coupling electrical power to wireless sensors 54 that are moving relative to the power supply 62. The power supply 62 may thereby be used to provide power to wireless sensors 54 that are stationary relative to the outer ring gear 52 without requiring electrical power to be coupled across a moving interface.

Figure 9:
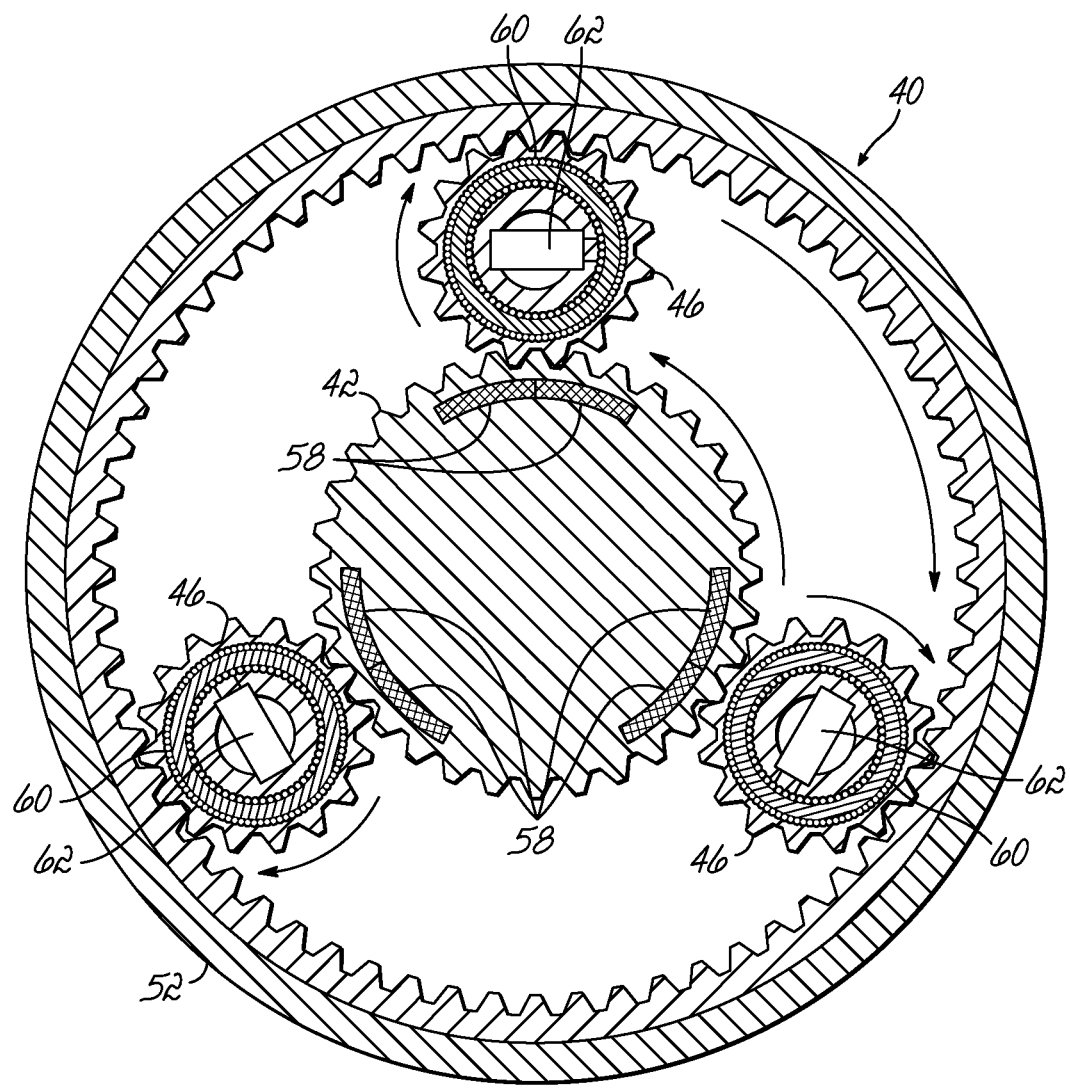

With specific reference to FIG. 9, the armatures 60 are mounted in fixed positions relative to the planet gears 46, and the magnets 58 mounted in fixed positions relative to sun gear 42 generally as shown. The armatures 60 may be mounted on the planet gears 46, or in cavities within the planet gears 46, and the magnets 58 may be mounted on the sun gear 42, or in cavities within the sun gear 42. When relative motion occurs between the sun gear 42 and carrier 48, such as when the carrier 48 rotates about a fixed sun gear 42, planet gears 46 may rotate about their respective pins 50, causing magnets 58 to move relative to the armatures 60, so that voltages may be induced in armatures 60 by the relative motion of the armatures 60 through the magnetic fields produced by the magnets 58. The power supply 62 conditions and stores the power harvested by the armatures 60 so that it may supply power to one or more wireless sensors 54. For armatures 60 mounted to the planet gears 46, the power supply 62 may be used to provide power to one or more wireless sensors 54 mounted to the planet gears 46, thus avoiding coupling electrical power to wireless sensors 54 that are moving relative to the power supply 62. The power supply 62 may thereby be used to provide power to wireless sensors 54 mounted in their associated planet gears 46 without requiring electrical power to be coupled across a moving interface.

Figure 10:
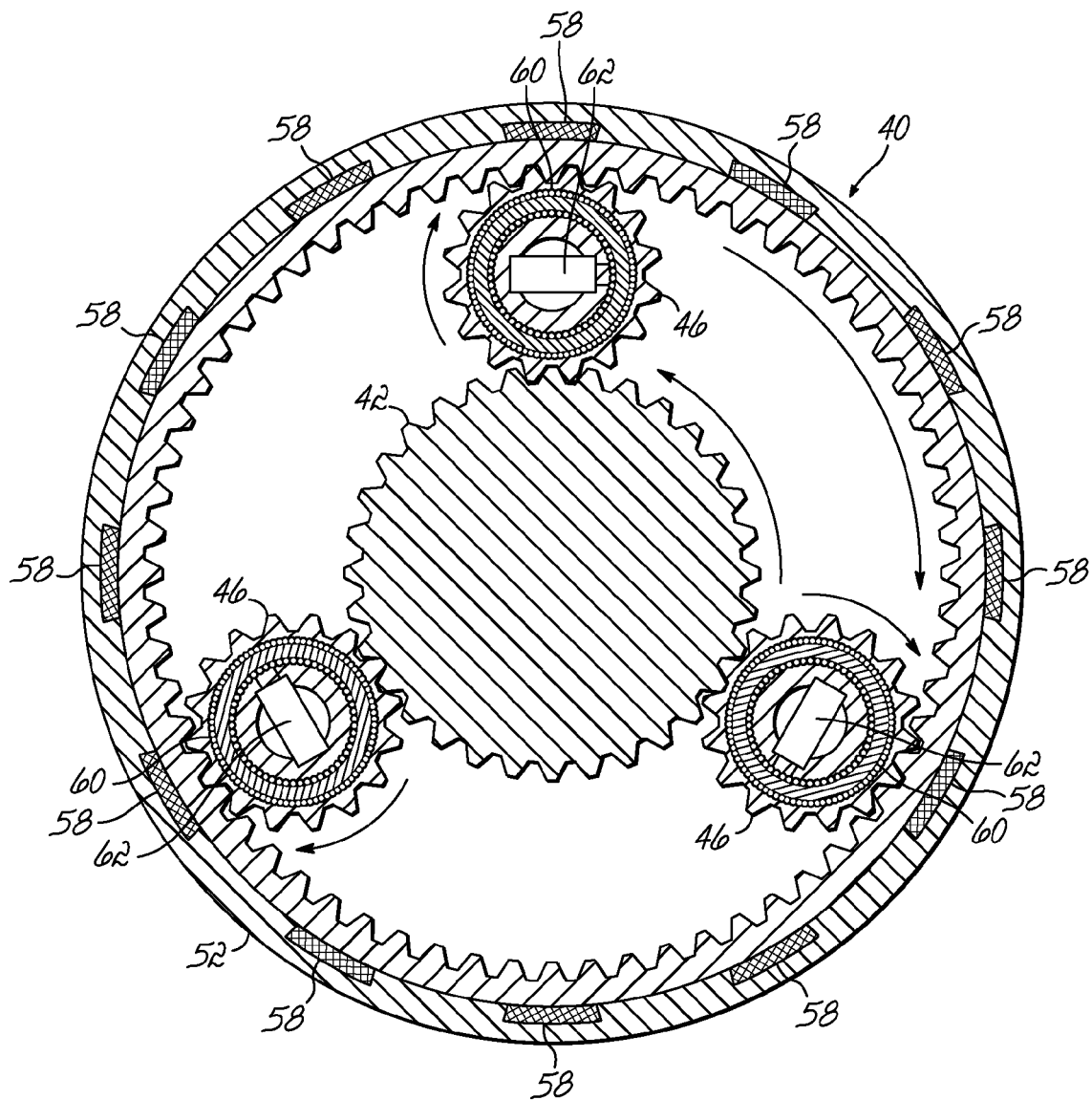

With specific reference to FIG. 10, the armatures 60 are mounted in fixed positions relative to the planet gears 46, and the magnets 58 are mounted in fixed positions relative to the outer ring gear 52 generally as shown. The armatures 60 may be mounted on the planet gears 46, or in cavities within the planet gears 46, and the magnets 58 may be mounted on the outer ring gear 52, or in cavities within the outer ring gear 52. When relative motion occurs between the sun gear 42 and carrier 48, such as when the carrier 48 rotates about a fixed sun gear 42, planet gears 46 may rotate about their respective pins 50, causing armatures 60 to move relative to the magnets 58, so that voltages may be induced in armatures 60 by the relative motion of the armatures 60 through the magnetic fields produced by the magnets 58. The power supply 62 conditions and stores the power harvested by the armatures 60 so that it may supply power to one or more wireless sensors 54. For armatures 60 mounted to the planet gears 46, the power supply 62 may be used to provide power to one or more wireless sensors 54 mounted to the planet gears 46, thus avoiding coupling electrical power to wireless sensors 54 that are moving relative to the power supply 62. The power supply 62 may thereby be used to provide power to wireless sensors 54 mounted in their associated planet gears 46 without requiring electrical power to be coupled across a moving interface.

Figure 11:
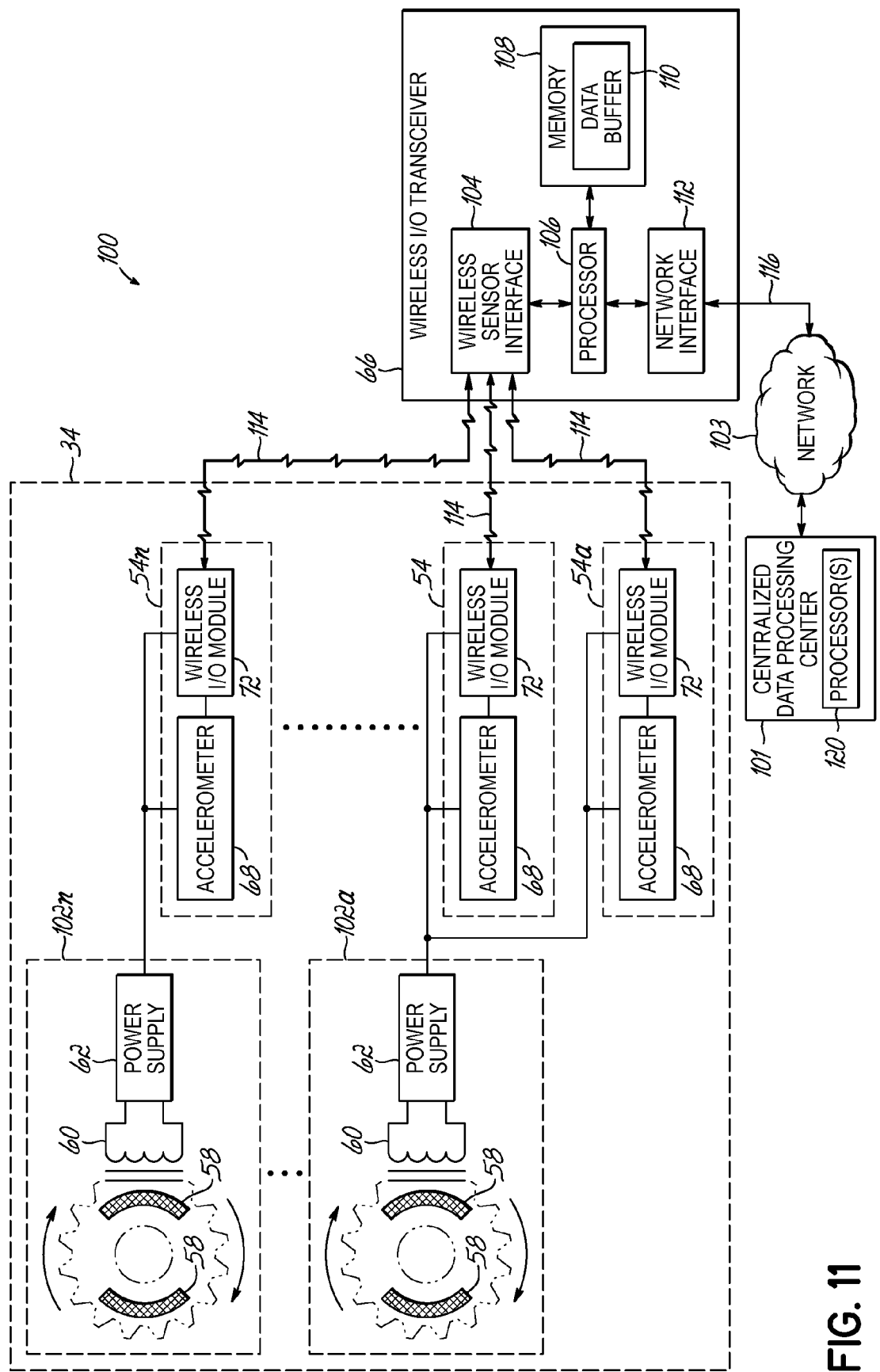
FIG. 11 is a block diagram showing a data transmission system for conveying data generated by the wireless sensors in the gearbox to a centralized data processing center.

With reference to FIG. 11, in which like reference numerals refer to like features in FIGS. 1-10 and in accordance with an embodiment of the invention, a block diagram is presented illustrating a wind turbine gearbox component health monitoring system 100. The monitoring system 100 collects data from the internal components of one or more wind turbine gearboxes 34 and stores it in a database at a centralized data processing center 101. This data may be, for example, vibrational data. Data may be collected from one or more wireless sensors 54 in each gearbox 34 by the wireless I/O transceiver 66, which relays the data to a centralized data processing center 101 over a network 103. The data collected by the monitoring system 100 may be from a single wind turbine 10, a single wind farm, or it may be from multiple wind farms in different locations. Once the data has been collected, it may be analyzed by the monitoring system 100 to determine the health status of the gearboxes 34. Wind turbine operators may access the database at the centralized data processing center 101, and may also receive alerts from the monitoring system 100 advising them of predicted component failures and a recommended course of action.

The monitoring system 100 includes one or more wireless sensors 54a-54n, and power sub-generators 102a-102m located inside the gearbox 34. The power sub-generators 102 include magnets 58 inductively coupled to the armatures 60, which are, in turn, electrically coupled to the power supplies 62. The magnets 58 are mounted to internal gearbox components so that they move relative to the armatures 60 whenever the gearbox 34 is in motion. Each sub-generator 102 may power one or more wireless sensors 54, and conversely, each wireless sensor 54 may receive power from more than one sub-generator 102, so that the number of sub-generators 102 is not necessarily the same as the number of wireless sensors 54.

The wireless sensors 54 may include an accelerometer 68, or other vibration sensor, which may be mounted to a gearbox component, and a wireless I/O module 72. The wireless I/O module 72 is adapted to receive signals from the accelerometer 68 that represent the vibration energy present in the monitored component, and to transmit the signals to the wireless I/O transceiver 66. Alternatively, the signals may be preserved in on-board storage 80 for later transmission to the wireless I/O transceiver 66.

The wireless I/O transceiver 66 may include a wireless sensor interface 104, a processor 106, memory 108, a data buffer 110, and a network interface 112. Wireless sensors 54 may be commercially available wireless accelerometers, and may be communicatively coupled through the wireless sensor interface 104 using a wireless link 114 such as IEEE 802.15.1 (Bluetooth), IEEE 802.11 (Wi-Fi), IEEE 802.15.4 (including ZigBee, WirelessHART, and MiWi), an ultra wideband transmission using a proprietary protocol, or any other suitable wireless communication protocol. Wireless sensors 54 may save received data in on-board storage 80, transmitting the data in bursts at periodic intervals to conserve power, or may transmit data continuously in real time. The wireless link 114 may include error correction, such as a cyclical redundancy check (CRC), to prevent loss or corruption of data, and may trigger data streaming based on availability of wireless sensor 54 signals. Alternatively, the wireless sensor interface 104 may be adapted to receive analog transmissions representative of the raw signals from the wireless sensors 54. The analog signals may be converted into a digital format by either the wireless sensor interface 104, or processor 106 and stored in the data buffer 110, or transmitted in real time by the network interface 112 to the centralized data processing center 101.

The wireless I/O transceiver 66 may be communicatively coupled to the centralized data processing center 101 through a network 103, so that the wireless sensors 54 may transmit wireless sensor data through the network interface 112 to the centralized data processing center 101. The wireless sensor data may be transported using a network protocol such as User Datagram Protocol/Internet Protocol (UDP/IP), or Transmission Control Protocol/Internet Protocol (TCP/IP) over a path that may include a local link 116 to the network 103. Local link 116 may be a hardwired link, such as an IEEE 802.3 (Ethernet) link, or a wireless link using a wireless network protocol, such as a Wi-Fi, or a proprietary link, such as a spread-spectrum transmission using an unlicensed band, such as the 902-928 MHz Industrial, Scientific and Medical (ISM) band. The wireless I/O transceiver 66 may transmit wireless sensor 54 data in real time as it is received, or it may store sensor data using the data buffer 110 for later transmission.

The data transmitted to the centralized data processing center 101 may be raw sensor data, or the wireless I/O transceiver 66 may perform data analysis and processing prior to transmission. Processing may include any one or all of the following techniques like frequency analysis using fast Fourier transforms (FFTs), wavelet transforms and other signal analysis techniques to detect faults or obtain fault information. Processing data locally may allow the wireless I/O transceiver 66 to transmit processed data or fault codes to the centralized data processing center 101, conserving network bandwidth and server processing capacity. Time stamps may also be added to data transmission packets to enable the centralized data processing center 101 to track data with respect to time. To facilitate data processing before transmission, the processor 106 may include a field programmable gate array (FPGA) based digital signal processor (DSP).

The centralized data processing center 101 may store sensor data from multiple wind turbines 10 and wind farms in a database categorized by location, time and other service data. Data may be analyzed automatically by programs running on one or more the processors 120 of servers in the centralized data processing center 101 to find potential problems. Based on the data received from each wireless I/O transceiver 66, the centralized data processing center 101 may generate reports or alarms to provide operators with information about the health status of individual wind turbines 10. Reports may include a list of suspected component anomalies, as well as estimated time to failure and suggested remedies. System users may also access the centralized data processing center 101 to download or analyze vibration data, or to check on the status of a particular wind turbine 10. Remote access to the data processing center may be made available to wind farm operators, and may include security features so that authorized users can only access information on wind turbines under their supervision.

As will be appreciated by one skilled in the art, the embodiments of the invention may also be embodied in a computer program product embodied in at least one computer readable storage medium having computer readable program code embodied thereon. The computer readable storage medium may be an electronic, magnetic, optical, electromagnetic, infrared, or semiconductor system, apparatus, or device, or any suitable combination thereof, that can contain, or store a program for use by or in connection with an instruction execution system, apparatus, or device. Exemplary computer readable storage media include, but are not limited to, a hard disk, a floppy disk, a random access memory, a read-only memory, an erasable programmable read-only memory, a flash memory, a portable compact disc read-only memory, an optical storage device, a magnetic storage device, or any suitable combination thereof. Computer program code for carrying out operations for the embodiments of the present invention may be written in one or more object oriented and procedural programming languages.

The methods described herein can be implemented by computer program instructions supplied to the processor of any type of computer to produce a machine with a processor that executes the instructions to implement the functions/acts specified herein. These computer program instructions may also be stored in a computer readable medium that can direct a computer to function in a particular manner. To that end, the computer program instructions may be loaded onto a computer to cause the performance of a series of operational steps and thereby produce a computer implemented process such that the executed instructions provide processes for implementing the functions/acts specified herein.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Furthermore, to the extent that the terms "includes", "having", "has", "with", "composed of", or variants thereof are used in either the detailed description or the claims, such terms are intended to be inclusive in a manner similar to the term "comprising."

While the invention has been illustrated by a description of various embodiments and while these embodiments have been described in considerable detail, it is not the intention of the applicant to restrict or in any way limit the scope of the appended claims to such detail. Additional advantages and modifications will readily appear to those skilled in the art. For example, while the above was described in relation to an epicyclic gearbox, aspects of the invention may be beneficially used with a broader range of gearboxes. Additionally, aspects of the invention may be used in a broader range of applications that have relative moving components for which some type of monitoring may be desired. Moreover, it should be understood that while the electrical device disclosed herein primarily pertained to a wireless sensor, other electrical devices may benefit from certain aspects of the invention, including but not limited to the power harvesting aspects for powering the electrical device. Therefore, the invention in its broader aspects should not be limited to the specific details, representative methods, and illustrative examples shown and described. Accordingly, departures may be made from such details without departing from the spirit or scope of the general inventive concept.

What is claimed is:

1. An apparatus for use in a power generation system, the apparatus comprising:
 a gearbox including a gear set having a first component and a second component movable relative to the first component;
 an armature attached to the first component of the gear set;
 a magnet attached to the second component of the gear set, the magnet and the armature arranged to exhibit relative motion during operation of the gear set so that the armature is subjected to a changing magnetic field from the magnet that generates electrical energy; and
 an electrical device inside the gearbox, the electrical device electrically coupled with the armature so that the electrical device is powered by the generated electrical energy.

2. The apparatus of claim 1, wherein the gear set is an epicyclic gear set including an outer ring gear, a sun gear, a plurality of planetary gears coupling the sun gear with the outer ring gear, and a carrier supporting the planetary gears.

3. The apparatus of claim 2, wherein the first component is selected from one of the outer ring gear, the sun gear, one of the planetary gears, or the carrier, and the second component is selected from another of the outer ring gear, the sun gear, one of the planetary gears, or the carrier.

4. The apparatus of claim 3, wherein the first component is one of the planetary gears.

5. The apparatus of claim 3, wherein the second component is one of the planetary gears.

6. The apparatus of claim 1, wherein the electrical device is attached to the gear set.

7. The apparatus of claim 6, wherein the electrical device is attached to the first component of the gear set.

8. The apparatus of claim 1, wherein the electrical device comprises a wireless sensor configured to sense a variable relating to the operation of the gearbox and to wirelessly output a signal indicative of the sensed variable.

9. The apparatus of claim 8, wherein the sensed variable is vibration energy generated inside the gearbox.

10. The apparatus of claim 8, wherein the wireless sensor includes a transceiver that wirelessly outputs the signal, the apparatus further comprising:
 an antenna associated with the gearbox, the antenna configured to receive the signal from the transceiver of the wireless sensor and to communicate the signal to another transceiver external to the gearbox.

11. The apparatus claim 1, further comprising:
 a power supply electrically coupling the armature with the electrical device, the power supply configured to capture and condition the electrical energy supplied from the armature to the electrical device.

12. The apparatus of claim 1, wherein the power generation system is a wind turbine including a rotor and a generator, and the gear set of the gearbox operatively couples the rotor with the generator.

13. A method of powering an electrical device in a gearbox, the gearbox having a gear set with a first component and a second component movable relative to the first component, comprising:
 attaching an armature to the first component of the gear set;
 attaching a magnet to the second component of the gear set;
 placing an electrical device inside the gearbox; and electrically coupling the electrical device with the armature so that electrical energy from the armature powers the electrical device when the first and second components are moved relative to each other.

14. The method of claim 13, wherein the gear set is an epicyclic gear set including an outer ring gear, a sun gear, a plurality of planetary gears coupling the sun gear with the outer ring gear, and a carrier supporting the planetary gears, wherein:
    attaching the armature to the first component further comprises attaching the armature to one of the outer ring gear, the sun gear, one of the planetary gears, or the carrier; and
    attaching the magnet to the second component further comprises attaching the magnet to another of the outer ring gear, the sun gear, one of the planetary gears, or the carrier.

15. The method of claim 13, wherein placing the electrical device inside the gearbox further comprises:
    attaching the electrical device to the gear set.

16. The method of claim 13, wherein the electrical device comprises a wireless sensor configured to sense a variable relating to the operation of the gearbox and to wirelessly output a signal indicative of the sensed variable.

17. The method of claim 16, wherein the sensed variable is vibration energy generated inside the gearbox.

18. The method of claim 16, further comprising:
    configuring the wireless sensor with a transceiver capable of wirelessly outputting the signal.

19. The method of claim 18, further comprising:
    configuring the gearbox with a transceiver capable of receiving the signal from the transceiver of the wireless sensor and communicating the signal to another transceiver external to the gearbox.

20. A method of powering an electrical device in a gearbox having a gear set with a first component and a second component movable relative to the first component, comprising:
    causing relative movement between an armature attached to the first component of the gear set and a magnet attached to the second component of the gear set;
    generating electrical energy in the armature by subjecting the armature to a changing magnetic field from the magnet; and
    powering an electrical device inside the gearbox with the electrical energy.

21. The method of claim 20, wherein the electrical device comprises a wireless sensor, the method further comprising:
    sensing a variable relating to the operation of the gearbox with the wireless sensor; and
    wirelessly outputting a signal indicative of the sensed variable from the wireless sensor.

22. The method of claim 21, wherein the sensed variable is vibration energy generated inside the gearbox.

23. The method of claim 21, wherein the wireless sensor includes a transceiver that wirelessly outputs the signal, the method further comprising:
    transmitting the signal from the transceiver to another transceiver external to the gearbox.

24. The method of claim 21, wherein the wireless sensor includes a transceiver that wirelessly outputs the signal, the method further comprising:
    communicating the signal from the transceiver to an antenna associated with the gearbox; and
    communicating the signal from the antenna to another transceiver external to the gearbox.

25. The method of claim 20, further comprising: capturing and conditioning the electrical energy supplied from the armature to the electrical device with a power supply that electrically couples the armature with the electrical device.

26. A method for monitoring a health status of wind turbine gearbox, the method comprising:
    operating the wind turbine gearbox;
    in response to operating the wind turbine gearbox, collecting vibrational data using a wireless sensor inside the wind turbine gearbox;
    powering the wireless sensor with energy harvested from the operation of the wind turbine gearbox;
    communicating the vibrational data from the wireless sensor externally of the wind turbine gearbox; and
    analyzing the vibrational data to determine the health status of the wind turbine gearbox.

27. The method of claim 26 further comprising:
    causing the monitoring system to alert a wind turbine operator of the health status of the wind turbine gearbox.

28. A monitoring system for monitoring a health status of wind turbine gearbox, the wind turbine gearbox having a gear set having a first component and a second component movable relative to the first component, the monitoring system comprising:
    a wireless sensor configured to collect vibrational data from the wind turbine gearbox during operation;
    an armature attached to the first component of the gear set, the armature coupled with the wireless sensor;
    a magnet attached to the second component of the gear set, the magnet and the armature arranged to exhibit relative motion during operation of the gear set so that the armature is subjected to a changing magnetic field from the magnet that generates electrical energy supplied from the armature to the wireless sensor; and
    a processing center coupled in communication with the wireless sensor, the processing center configured to receive the vibrational data communicated from the wireless sensor and to analyze the vibrational data to determine the health status of the wind turbine gearbox.

29. The monitoring system of claim 28 wherein the processing center is further configured to cause the monitoring system to alert a wind turbine operator of the health status of the wind turbine gearbox.

* * * * *